(12) United States Patent
Kim

(10) Patent No.: US 11,993,735 B2
(45) Date of Patent: May 28, 2024

(54) BIODEGRADABLE, CURABLE COMPOSITION AND STRUCTURE USING THE SAME

(71) Applicant: Ho Min Kim, Anyang-si (KR)

(72) Inventor: Ho Min Kim, Anyang-si (KR)

( * ) Notice: Subject to any disclaimer, the term of this patent is extended or adjusted under 35 U.S.C. 154(b) by 652 days.

(21) Appl. No.: 17/231,054

(22) Filed: Apr. 15, 2021

(65) Prior Publication Data

US 2021/0324253 A1    Oct. 21, 2021

(30) Foreign Application Priority Data

Apr. 21, 2020  (KR) ........................ 10-2020-0048071

(51) Int. Cl.
| | | |
|---|---|---|
| *C09J 189/04* | (2006.01) | |
| *C05F 1/00* | (2006.01) | |
| *C05F 11/02* | (2006.01) | |
| *C08L 89/06* | (2006.01) | |

(52) U.S. Cl.
CPC ............. *C09J 189/04* (2013.01); *C08L 89/06* (2013.01); *C05F 1/005* (2013.01); *C05F 11/02* (2013.01); *C08L 2201/06* (2013.01); *C08L 2203/10* (2013.01)

(58) Field of Classification Search
None
See application file for complete search history.

(56) References Cited

U.S. PATENT DOCUMENTS

2023/0041816 A1 *   2/2023   Wales ................. A21D 10/005

FOREIGN PATENT DOCUMENTS

| JP | H11-116950 A | 4/1999 |
| KR | 10-2017-0132416 A | 12/2017 |

* cited by examiner

*Primary Examiner* — Lee E Sanderson
(74) *Attorney, Agent, or Firm* — KORUS Patent, LLC; Seong Il Jeong

(57) ABSTRACT

The present disclosure provides a curable composition containing 20 to 30 wt % of boiled meat slices, 1 to 15 wt % of konjac, 30 to 50 wt % of glue, and 5 to 15 wt % of kelp, and a structure using the same.

8 Claims, No Drawings

BIODEGRADABLE, CURABLE COMPOSITION AND STRUCTURE USING THE SAME

BACKGROUND

1. Technical Field

The present disclosure relates to a biodegradable, curable composition and structure, and more particularly to a curable composition that may replace an environmentally friendly PET bottle or plastic container, and a structure using the same.

2. Description of the Related Art

Plastics have been used as materials for various products due to their higher strength and lighter weight than metals and ceramics, and have also been used in various fields ranging from disposable products to large-sized structures due to various methods for molding the same. However, where plastics are buried in landfills for waste disposal, a problem arise in that the plastics remain intact without being degraded. In addition, the plastic materials are decomposed into fine plastic, causing another environmental problem. In addition, where non-degradable plastics are incinerated, large amounts of toxic gases are generated, causing secondary pollution. Thus, many studies have been conducted on methods for disposal of waste plastics.

As one of realistic countermeasures, biodegradable polymers have attracted attention, which have started to be produced commercially. In addition thereto, attention has been focused on plastics/elastomeric polymers derived from biomass, from the perspective of countermeasures against global warming gases and effective use of resources.

Biopolymers are environmentally friendly materials that enable the establishment of a sustainable society and may pursue low-carbon green growth, and examples thereof include biodegradable polymer resins and biodegradable plastics, which may be completely degraded by microorganisms under certain conditions.

The term "biodegradable plastics" is a generic term for biodegradable multi-degradable chemical decomposition or biodegradation, and refers to plastics that are used as molded products, packaging materials, hygiene products, agricultural products, etc. and are completely degraded into water, carbon dioxide, methane gas, biomass and the like by their biodegradability within months to years after disposed of as waste without incineration.

In recent years, biodegradable plastics, which are degraded by soil microorganisms, and photodegradable plastics, which are degraded by solar ultraviolet rays, have been developed. However, the biodegradable plastics are readily degraded, but have the problem of high production costs, and the photodegradable plastics have a problem in that, when they are buried in landfills, they are not degraded because they are not exposed to sunlight.

Technology that uses rice, starch, or paper as a substitute for plastic has been developed. However, this material does not maintain its shape when exposed to a liquid, and thus still has many problems to be solved for use as a substituent for plastic.

SUMMARY

The present disclosure has been contrived in order to overcome the above-described problems, and provides a curable composition containing 20 to 30 wt % of boiled meat slices, 1 to 15 wt % of konjac, 30 to 50 wt % of glue, and 5 to 15 wt % of kelp, and a structure using the same.

A curable composition according to one embodiment of the present disclosure contains 20 to 30 wt % of boiled meat slices, 1 to 15 wt % of konjac, 30 to 50 wt % of glue, and 5 to 15 wt % of kelp.

The curable composition according to one embodiment of the present disclosure corresponds to a pH of about 2.5.

The curable composition according to one embodiment of the present disclosure has a degradation time of 5 minutes or less.

The glue according to one embodiment of the present disclosure includes 5 to 15 wt % of an animal bone extract.

The curable composition according to one embodiment of the present disclosure may be used as a fertilizer.

The structure according to one embodiment of the present disclosure is produced by injection molding or extrusion molding of the curable composition.

The structure according to one embodiment of the present disclosure has a thickness of 0.5 mm to 2.4 mm.

The structure according to one embodiment of the present disclosure has a straw shape, a cup shape, a container shape, or a cup lid shape.

DETAILED DESCRIPTION

Words of degree, such as "about," "substantially," and the like are used herein in the sense of "at, or nearly at, when given the manufacturing and material tolerances inherent in the stated circumstances."

As used throughout the present specification, the term "combination(s) thereof" included in any Markush-type expression means a mixture or combination of one or more elements described in the Markush-type expression.

As used throughout the present specification, the term "A and/or B" refers to "A," "B," or "A and B."

A curable composition according to the present disclosure contains 20 to 30 wt % of boiled meat slices, 1 to 15 wt % of konjac, 30 to 50 wt % of glue, and 5 to 15 wt % of kelp.

Boiled Meat Slices

The curable composition according to the present disclosure contains boiled meat slices in an amount of 20 to 30 wt % based on 100 wt % of the curable composition.

In general, boiled meat slices arte made by boiling beef or pork and draining the boiled beef or pork by pressing, followed by cutting into slices. The boiled meat slices according to the present disclosure are made using drained pork. Of the ingredients of pork, water makes up 70%, and protein makes up the second largest portion (about 20%). The proteins that make up pork may be classified into sarcoplasmic protein, myofibrillar protein, and stroma protein.

The sarcoplasmic protein is present in the meat in a liquid state dissolved in the muscle plasma between the myofibrils, and contains various meat pigments and enzymes. The myofibrillar protein is also called structural protein because it forms the structure of the meat. The myofibrillar protein is composed of myosin and actin, which are major proteins involved in muscle contraction, and various regulatory proteins that regulate muscle contraction. The stroma protein is also called connective tissue protein because it mainly forms connective tissues such as sarcolemmal membranes and capillaries. The stroma protein is composed of fibrous proteins such as collagen, elastin, and reticulin.

Collagen is a natural polymer contained in pork skin, cartilage and tendons that make up the boiled meat slices.

Because collagen has very limited mechanical properties, the physical properties thereof need to be improved by chemical crosslinking.

When collagen is acid-treated, alkali-treated, or heated, gelatin, a kind of denatured protein, is obtained. Gelatin is a natural polymer having a single-helix structure transformed from the triple-helix structure of collagen.

In collagen, three polypeptide chains with a helical structure form a triple helix again. Collagen is stabilized by hydrogen bonds within or between chains, and when the hydrogen bonds are destroyed by heat or a denaturing agent, gelatin consisting of polypeptide chains on a random coil is obtained. The net structure of recombined gelatin molecules provides strength, and as the gelatin proportion increases, the hardness and elasticity increase. Gelatin is a material having excellent biocompatibility and biodegradability, and dissolves in hot water to become a sol, and becomes an elastic gel at room temperature.

Gelatin has a disadvantage in that it becomes liquid again when heated, and thus the shape thereof is difficult to maintain. The viscosity of gelatin decreases with increasing temperature increases or decreasing pH, but a composition having a solidifying property is used to provide the hardness of the shape and has the property of being insoluble in organic solvents such as alcohol, ether, benzene, and acetone.

The boiled meat slices are preferably contained in an amount of 20 to 30 wt % based on 100 wt % of the composition. If the content of the boiled meat slices is less than 20 wt %, the composition is likely to be broken by external impact, and if the content of the boiled meat slices is more than 30 wt %, a problem arises in that, when the curable composition is in a high-temperature environment, the viscosity decreases, making it difficult to maintain the shape thereof. That is, if the content of the boiled meat slices excessively increases, the contents of konjac, glue, and kelp relatively decrease, resulting in a disadvantage in that the mechanical properties of the curable composition, a final product, are deteriorated.

Konjac

The curable composition according to the present disclosure may contain konjac in an amount of 1 to 15 wt % based on 100 wt % of the composition.

Konjac according to an embodiment of the present disclosure is made by drying, crushing and milling *Amorphophallus konjac*. Konjac may contain 92% water, 6.5% carbohydrate, 1% protein, and 0.1% fat.

The main component of konjac is a polysaccharide called glucomannan. Glucomannan has a high viscosity, swells when water is added, and has the property of hardening when dried.

The main component of glucomannan is a mannose polymer containing glucose side chains. Glucomannan is a water-soluble polysaccharide containing D-glucose and D-mannose as its main components, and is also called konjac mannan.

Glucomannan is contained in the tubers of Orchidaceae plants, *Amorphophallus konjac*, irises, lilies, and grass, and may be extracted from a solution extracted by heating with water under pressure. The extracted glucomannan is isolated via an insoluble copper complex, and contains β-D-glucopyranose and β-D-mannopyranose bound at a ratio of 7:3. Glucomannan is highly absorbent and alkaline, becomes sticky by absorbing water, and solidifies when heated to form a translucent gel with high elasticity.

Konjac according to the present disclosure is preferably contained in an amount of 1 to 15 wt % based on 100 wt % of the composition. If the content of konjac is less than 1 wt %, a problem arises in that, when the curable composition is in a high temperature environment, the viscosity thereof decreases, making it difficult to maintain thereof, and if the content of konjac is more than 15 wt %, the curable composition has a disadvantage in that it is easily broken by external impact.

Poly(lactic acid) (PLA) materials based on conventional vegetable starch (corn) are also hard and resistant to high heat, but have a disadvantage in that they are weak against external impact.

Accordingly, when konjac containing glucomannan is mixed with the boiled meat slices containing gelatin, the physical properties of the two materials may be mutually complemented. For example, when the boiled meat slices whose viscosity decreases with increasing temperature are mixed with konjac whose viscosity increases with increasing temperature, the shape of the curable composition may be maintained constant.

Glue

The curable composition according to the present disclosure contains glue in an amount of 30 to 50 wt % based on 100 wt % of the composition.

For example, glue may correspond to an extract made by boiling animal bones, skins, intestines, and the like. Glue serves as an adhesive that sticks the boiled meat slices, konjac and kelp together and bonds the components of the curable composition. Glue is mainly composed of gelatin, does not dissolve in organic solvents, dissolves slowly in cold water, leading to an increase in its volume, and dissolves rapidly in hot water to form a colloid with high tenacity.

For example, glue may correspond to a representative animal adhesive having adhesive strength.

The glue according to the present disclosure is preferably contained in an amount of 30 to 50 wt % based on 100 wt % of the composition.

If the content of glue is less than 30 wt %, the components of the composition may not be properly stuck together, and thus it is difficult for a user to extrude the composition in a desired shape, and if the content of glue is more than 50 wt %, the contents of the boiled meat slices, konjac and kelp relatively decrease, resulting in a disadvantage in that the mechanical properties of the curable composition, a final product, are deteriorated.

The glue according to the present disclosure may contain an animal bone extract and/or an animal skin extract.

The glue according to the present disclosure contains an animal bone extract in an amount of 5 to 15 wt % based on 100 wt % of the glue.

The glue according to the present disclosure contains an animal skin extract in an amount of 15 to 25 wt % based on 100 wt % of the glue.

Where the curable composition according to the present disclosure is composed only of the boiled meat slices, konjac and kelp, a problem may arise because the composition has a low strength. For this reason, the curable composition contains the glue containing the animal bone extract and/or the animal skin extract. Therefore, the components of the composition may be easily stuck together, and thus may exhibit mechanical properties comparable to those of plastics, and at the same time, the degradability of the curable composition may be improved, thus achieving the object of the present disclosure.

Kelp

The curable composition according to the present disclosure contains kelp in an amount of 5 to 15 wt % based on 100 wt % of the composition.

The kelp according to the present disclosure is one of brown algae belonging to the seaweed family, and the main components thereof are iodine, carbohydrate, and protein.

The carbohydrate of the kelp according to the present disclosure contains agarose. Agarose is a hexose polymer called agarobiose. Solid agarose does not dissolve well in water, but when the temperature thereof is increased, the solid agarose dissolves due to the breakage of intermolecular hydrogen bonds thereof, and when the temperature thereof is decreased again, the agarose becomes solid. Agarose may be used as a polymer polysaccharide support for immobilizing the components of the curable composition.

The kelp according to the present disclosure is preferably contained in an amount of 5 to 15 wt % based on 100 wt % of the composition. If the content of the kelp is less than 5 wt %, there is a disadvantage in that the hydrophobicity of the curable composition decreases and the hydrophilicity thereof increases, so that the composition is vulnerable to moisture, and if the content of the kelp is more than 15 wt %, a problem arises in that, when the curable composition is in a high-temperature environment, the viscosity thereof decreases, making it difficult to maintain the shape thereof.

Injection Molding Process

The composition containing the components at a certain weight ratio according to the present disclosure may be produced into a structure having a desired shape by using various methods.

An injection molding method for producing a structure according to one embodiment of the present disclosure is as follows.

First, based on 100 wt %, 20 to 30 wt % of boiled meat slices, 1 to 15 wt % of konjac, 30 to 50 wt % of glue, and 5 to 15 wt % of kelp are placed in a container. The placed raw materials are melted by boiling in water at 60 to 90° C. for about 5 minutes (melting process). The actual temperature of each raw material in the boiling process is 70 to 80° C. After the raw materials are melted, a stirring (mixing) process is performed (stirring process). The stirring process is performed until the color of the mixture becomes uniform.

During the melting process, all of the raw materials may be melted in one container at once, or each raw material may be melted separately in each container. When the melting process is performed in one container, the melting process and the stirring process may be performed simultaneously. When the melting process is performed in a separate container for each raw material, the stirring process may be performed sequentially after the melting process is performed. When the pH of the mixture in the stirring process reaches a pH of about 2 to 4, the stirring process is completed.

After the stirring process, the molten mixture is injected into a mold. The mixture injected into the mold is dried within about 30 seconds at about −10° C. in a state in which the mold is closed, thus forming a structure (drying process). Since the molten mixture begins to harden rapidly depending on the ambient temperature, the molten mixture is preferably injected inject within the shortest possible time as the ambient temperature decreases.

After the mixture is completely dried, the dried structure is taken out of the mold. The thickness of the structure is preferably 0.5 to 2.4 mm. If the thickness is more than 2.4 mm, drying may not be performed properly, and the drying time needs to be increased, resulting in a decrease in the efficiency of the production process. If the thickness is less than 0.5 mm, the structure may not maintain its shape in a liquid for a long time.

The structure according to one embodiment of the present disclosure may be a container or a straw. For example, the structure may be a container for a beverage or a straw for drinking a beverage, and may also be a cup for a beverage, a cup lid, a bowl, or the like.

Extrusion Molding Process

According to one embodiment of the present disclosure, a structure may be produced by extrusion molding of the curable composition according to the present disclosure. For example, when a structure (e.g., straw) having a certain cross section is to be produced, the structure may be produced through an extrusion molding process.

First, 20 to 30 wt % of boiled meat slices, 1 to 15 wt % of konjac, 30 to 50 wt % of glue, and 5 to 15 wt % of kelp are uniformly mixed, and the mixture is injected into a heating cylinder. The injected mixture may be heated and melted in the cylinder. At this time, the actual temperature of the raw materials may be 70 to 80° C.

The molten mixture is transferred into a mold, disposed at the end of the cylinder, by applied pressure in the cylinder, and is continuously extruded to the outside through the opening of the mold by the pressure inside the cylinder. The mixture extruded to the outside from the mold is dried air at about −10° C. for about 30 seconds or less. The drying process may be performed using a cooling water bath.

The structure according to an embodiment of the present disclosure may be exposed to a liquid. For example, the structure may be a straw which is used when drinking a beverage by immersing the same directly in the beverage. In addition, the structure may be a cup for containing a beverage, a cup lid, a bowl, a container, or the like.

Water-Repellent Performance Test

Example 1

A plurality of molds manufactured according to the size of a cup was prepared. 30 wt % of boiled meat slices, 10 wt % of konjac, 45 wt % of glue, and 15 wt % of kelp were prepared, and melted and stirred evenly so that the color thereof could be uniform, thus preparing a curable composition. Thereafter, the molten curable composition was injected into the cleanly washed and dried inner space of each mold. Then, the curable composition was dried at −10° C. for 30 seconds, thereby producing a structure.

Comparative Example 1

A commercially available poly(lactic acid) (PLA) straw produced using a mixture of vegetable starch and biodegradable resin was used.

Comparative Example 2

A commercially available paper straw produced by rolling paper was used.

Comparative Example 3

A straw containing, based on 100 wt % of a straw composition, 50 wt % of boiled meat slices and 50 wt % of glue, was used.

A water-repellent performance test was performed using a method in which each of the straw-shaped structures according to Example 1 and Comparative Examples 1 to 3 was placed in each of hot water at 60° C. and cold water at 20° C., and then changes occurring in the structures over time were observed. The results of the test are shown in Tables 1 and 2.

TABLE 1

Results of water repellency test in water at 60° C.

| | Example 1 | Comparative Example 1 | Comparative Example 2 | Comparative Example 3 |
|---|---|---|---|---|
| After 4 minutes | no change | no change | became soft due to water absorption | slippery, sticky and swollen |
| After 8 minutes | no change | no change | became soft due to water absorption | severe gelatin smeared |
| After 11 minutes | no change | no change | became soft due to water absorption | straw shape collapsed |
| After 15 minutes | no change | there was no change in shape, but starch was pushed out | shape was lost | — |
| After 20 minutes | there was no change in shape, but starch was pushed out | shape was lost | — | — |

TABLE 2

Results of water repellency test in water at 20° C.

| | Example 1 | Comparative Example 1 | Comparative Example 2 | Comparative Example 3 |
|---|---|---|---|---|
| After 10 minutes | no change | no change | weakly soft | there was no change in shape, but starch was pushed out |
| After 20 minutes | no change | no change | became soft due to water absorption | shape deformation started (shape was bent) |
| After 40 minutes | no change | became soft due to water absorption | became soft due to water absorption | shape was deformed (cracking occurred) |

As shown in Table 1 above, the structure according to Example 1 could maintain its shape in water at 60° C. for a significantly longer time than the structures according to Comparative Examples 1 to 3. In the case of the structure according to Comparative Example 1, starch was pushed out after 15 minutes, and the shape dissolved after 20 minutes. In the case of the structure according to Comparative Example 2, the solidity of the shape disappeared after 4 minutes, and the shape was lost after 15 minutes. In addition, in the case of the structure according to Comparative Example 3, shape changes, such as swelling and a slippery and sticky surface, occurred after 4 minutes, and the shape was lost after 11 minutes.

However, in the case of the structure according to Example 1, the gelatin began to exfoliate slightly after 20 minutes, and the shape was perfectly maintained.

As shown in Table 2 above, the structure according to Example 1 could maintain its shape in water at 20° C. for a significantly longer time than the structures according to Comparative Examples 1 to 3. The structure according to Comparative Example 1 lost its solidity after 40 minutes. In the case of the structure according to Comparative Example 2, the solidity of the shape disappeared after 20 minutes. In the case of the structure according to Comparative Example 3, gelatin was pushed out after 10 minutes, the structure was swollen after 20 minutes, and shape changes such as a sticky surface occurred. On the other hand, in the case of Example 1, there was no change in shape even after 40 minutes.

Tests for Degradation Performance and Durability Performance

TABLE 3

Results of tests for degradation performance and durability performance

| | Example 1 | Comparative Example 1 | Comparative Example 2 | Comparative Example 3 |
|---|---|---|---|---|
| Degradation time | 5 minutes | 90 days | 5 years | 3 minutes |
| Recycling process | simple | complex | complex | simple |
| Durability (0.8 m/1.6 m) | strong (no change/no change) | moderate (no change/deformed when dropped from a height of 1.6 m) | — | weak (bent/broken) |
| Use suitability | suitable | suitable | suitable | unsuitable |

As shown in Table 3 above, the degradation time of the structure according to Example 1 was 5 minutes or less, which is significantly shorter than those of the structures according to Comparative Examples 1 to 3. The term "degradation time" refers to the time taken for the structure to be degraded in water at about 80° C. or higher. Thus, the structure according to Example 1 may be recycled after use and easily produced again. For example, the structure of Example 1 may be melted by controlling temperature and/or pH, and solidified again and produced into a new structure within a short time.

A durability performance test was performed by a method in which, after the structures according to Example 1 and Comparative Examples 1 to 3 were dropped from heights of 0.8 m and 1.6 m, whether the structures perfectly maintained their shape was checked (Comparative Example 2 was excluded from this durability performance test). As a result of the test, the structure according to Example 1 was the only structure that had no abnormality in shape even when it was dropped from a height of 1.6 m, and the other structures were broken or deformed in shape. The structures according to Example 1 and Comparative Example 1 had no abnormality in shape even when they were dropped from a height of 0.8 m, and the structure according to Comparative Example 1 was broken by external impact when dropped from a height of 1.6 m.

From the results of the degradation performance and durability performance tests, it is confirmed that Example 1 is suitable for use, but Comparative Examples 1 to 3 are not suitable for use because they are easily affected by an external environment. The structure according to Comparative Example 1 is composed of a vegetable component that is relatively hard, but is inferior in flexibility and has the problem of being easily broken by external impact, the structure according to Comparative Example 2 is composed of paper whose original shape is difficult to maintain when absorbed water, and the structure according to Comparative Example 3 is composed only of gelatin that is easy to swell in water. Thus, when the straw structure according to Comparative Examples 2 or 3 was immersed in the liquid, it was swollen by absorbing water, so that the shape thereof was collapsed. This phenomenon occurred more rapidly as the water temperature increased.

On the other hand, in the case of the structure according to Example 1, the solubility thereof in water may be reduced by using a mixture of gelatin, glucomannan, agarose, and glue. Furthermore, according to Example 1, gelatin and glucomannan, which can complement each other while having strength and elasticity, are used together, and thus the structure according to Example 1 can maintain its shape for a long time even when exposed to water while being less affected by temperature. In addition, since agarose with a strong solidifying property and glue with strong adhesive strength are used, the structure according to Example 1 can maintain its shape without being broken even by external impact.

The structure produced using the curable composition according to the present disclosure is degraded at a high rate, when discarded, is recyclable, and is harmless to the human body. For example, the structure according to Example 1 can be easily biodegraded when discarded in soil or water, or can be recycled through a simple recycling process of adjusting heat or pH.

The curable composition according to the present embodiment is intended to replace plastics and may be used to produce all structures for replacing plastic structures.

As described above, the present disclosure provides a curable composition and a structure using the same, which may be naturally degraded regardless of the surrounding environment.

The present disclosure provides a curable composition and a structure using the same, which may perfectly maintain its shape even when exposed to a liquid for a long time.

The present disclosure provides a curable composition and a structure using the same, which may be used as a fertilizer.

The present disclosure provides an environmentally friendly curable composition and a structure using the same, which may replace plastics.

The present disclosure provides a curable composition and a structure using the same, which is not easily broken or damaged by external impact.

The present disclosure provides a curable composition and a structure using the same, which may be recovered and recycled.

The present disclosure provides a curable composition and a structure using the same, which may be changed in shape as necessary, and thus may be freely used to replace plastics in various applications.

The effects of the present disclosure are not limited to the above-mentioned effects, and other effects not mentioned herein will be clearly understood by those skilled in the art from the above detailed description and the appended claims.

The previous description of the present disclosure is provided to enable any person skilled in the art to make or use the present disclosure. Various modifications to the present disclosure will be readily apparent to those skilled in the art, and the generic principles defined herein may be applied to other variations without departing from the spirit or scope of the present disclosure. Thus, the present disclosure is not intended to be limited to the examples described herein, but is to be accorded the widest scope consistent with the principles and novel features disclosed herein.

Although the present disclosure has been described in conjunction with some embodiments in the present specification, it should be understood that various modifications and changes may be made without departing from the scope of the present disclosure as can be understood by those skilled in the art to which the present disclosure pertains. In addition, such modifications and changes should be considered to fall within the scope of the claims appended hereto.

What is claimed is:

1. A structure produced using a curable composition, wherein:
    the curable composition comprises:
        20 to 30 wt % of boiled meat slices;
        1 to 15 wt % of konjac;
        30 to 50 wt % of glue; and
        5 to 15 wt % of kelp; and
    the structure has a thickness of 0.5 mm to 2.4 mm.

2. The structure of claim 1, wherein the curable composition corresponds to a pH of 2.5.

3. The structure of claim 1, wherein a degradation time of the composition is 5 minutes or less.

4. The structure of claim 1, wherein the glue comprises an animal bone extract in an amount of 5 to 15 wt % based on 100 wt % of the glue.

5. The structure of claim 1, wherein the glue comprises an animal skin extract in an amount of 15 to 25 wt % based on 100 wt % of the glue.

6. The structure of claim 1, wherein the curable composition is usable as a fertilizer.

7. The structure of claim 1, produced by injection molding or extrusion molding.

8. The structure of claim 1, having a straw shape, a cup shape, a container shape, or a cup lid shape.

* * * * *